United States Patent
Wiegandt

[15] 3,685,746
[45] Aug. 22, 1972

[54] DISCHARGE DEVICE FOR REMOVING COMPACTED BED OF PARTICLES

[72] Inventor: Herbert F. Wiegandt, Cornell University, Ithaca, N.Y. 14850

[22] Filed: Aug. 27, 1969

[21] Appl. No.: 853,365

[52] U.S. Cl. ............................241/3, 241/46.02
[51] Int. Cl. ...........................B02c 18/10, B02c 18/22
[58] Field of Search.........241/3, 46.02, 46.04, 46.06, 241/46.11, 46.17, 188, 192; 62/58

[56] References Cited

UNITED STATES PATENTS

| | | | |
|---|---|---|---|
| 1,793,691 | 2/1931 | Green | 241/3 UX |
| 2,059,435 | 11/1936 | Brownlee | 241/3 UX |
| 2,565,226 | 8/1951 | Gross | 241/DIG. 17 |
| 2,684,207 | 7/1954 | O'Brien | 241/DIG. 17 |
| 3,073,131 | 1/1963 | Ashley | 62/58 |
| 3,329,350 | 7/1967 | Wisgerhof | 241/188 R X |
| 3,435,625 | 4/1969 | Wiegandt | 62/58 |

*Primary Examiner*—Donald G. Kelly
*Attorney*—I. William Millen

[57] ABSTRACT

A device for controlling a bed of compacting solids. The consolidating bed is propelled through a tubular passage by a concurrent flow of liquid; and an inturned lip, near the exit of the passage, constrains egress of the bed. A cutter sweeping zone proximate the lip comminutes advancing portions of the bed approaching the lip.

11 Claims, 7 Drawing Figures

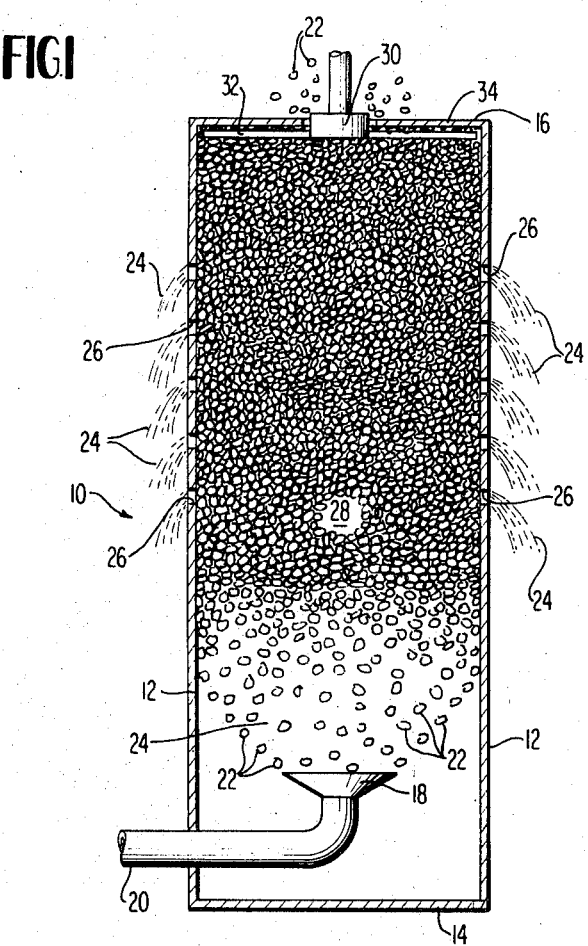
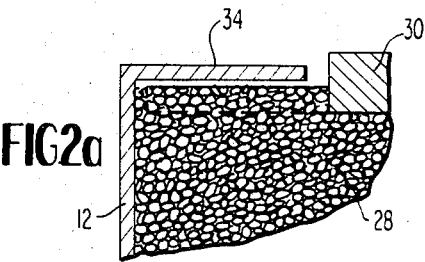
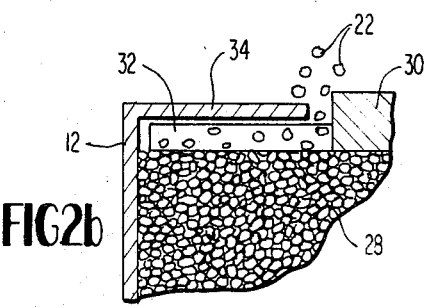
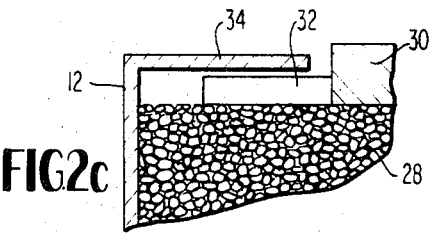
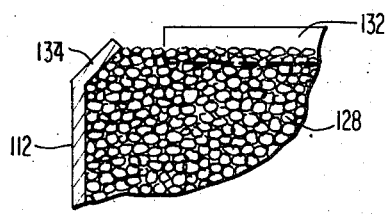
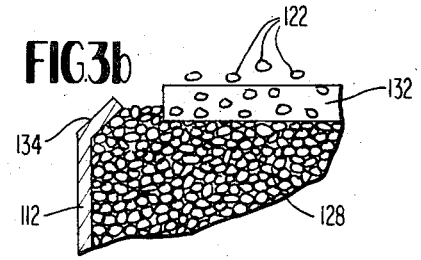
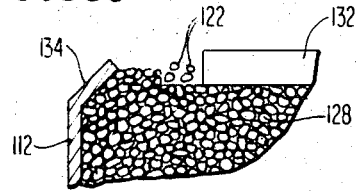
INVENTOR
HERBERT F. WIEGANDT
ATTORNEYS

DISCHARGE DEVICE FOR REMOVING COMPACTED BED OF PARTICLES

BACKGROUND OF THE INVENTION

This invention pertains to the process of compacting beds of solids and more particularly to devices for controlling compacting beds of solids such as ice crystals formed during freezing processes of desalinizing sea water.

In freezing processes of purifying sea water, pure water is separated from the salt water by freezing out water as ice, thereby creating a slurry of ice crystals and brine. The crystals are then separated from the brine for further processing, in a common process, by forming a consolidated or "piston" bed of crystals by introducing the slurry into a tubular passage having drainage ports in the walls thereof through which the brine or cocurrently flowing liquid phase of the slurry is discharged. The thus formed compacting bed is then propelled through the passage wherein, at the exit end, a scraper comminutes the bed and discharges the resultant crystals for further processing.

In a conventional piston bed, the slurry enters a vertical column and develops a consolidated bed of compacting particles.

In certain cases, a washing process may be incorporated wherein a downwardly flowing wash liquid maintains a relatively stationary "interface" between the slurry and the consolidated bed. Where consolidation is the only objective of the process, the drainage ports serve solely as an escape area for the cocurrently flowing liquid and the amount of liquid in the bed downstream of the drainage ports is substantially reduced from the quantity entering in the slurry. In these instances, it is necessary to have the bed develop a stable structure well in advance of the drainage ports so that erosion of the bed at the ports can be resisted.

Where greater compaction of the bed or where an increased flow of slurry liquor through a bed of predetermined length is required, it is desirable to increase the hydraulic pressure gradient between the entry and the drainage port. Although the bed may be held in position against the increased pressure gradient by appropriate counter-pressure at the discharge end, such an expedient may not be desirable and can complicate the process.

It has been proposed to provide a slotted rotating disc cutter to hold the bed in place; however, with a bed a few feet in diameter, the bed pressure against the disc could total many tons.

The rate of feed of the bed has generally been controlled by establishing a steady-state operation through the balancing of the opposing hydraulic forces and the frictional resistance of the solids moving along the passage walls against the hydraulic pressure at the inlet of the bed. Although such control can satisfactorily be established by control of the flows and setting back pressures, such control is complicated and requires care since, if the hydraulic pressure at the entry end of the passage is increased, the piston bed will emerge from the passage in the absence of any other restraining force.

SUMMARY OF THE INVENTION

This invention provides a device for controlling a compacting bed of particles which overcomes the disadvantages of the prior art by furnishing means for positive control of the bed in lieu of hydraulic balancing thereof.

The invention further provides means to positively control the rate of feed of a compacting bed of particles by furnishing a mechanical restraint to the advance of the bed which cooperates with a rotary cutter operating to comminute advancing portions of the bed.

In a preferred embodiment, the invention provides a tubular passage through which is fed a bed of compacting particles; an inturned lip at the exit of the passage to restrain egress of the bed and rotary cutter cooperating with the lip to comminute advancing portions of the bed as they approach the lip.

These and other objects and advantages of the invention will become better understood to those skilled in the art by reference to the following detailed description when viewed in light of the accompanying drawings wherein like components throughout the figures thereof are indicated by like numerals and wherein:

BRIEF DESCRIPTION OF THE DRAWINGS

FIG. 1 is a sectional view in elevation of a piston bed in accordance with the invention;

FIGS. 2a through 2c are fragmentary, enlarged views of the bed of FIG. 1 in sequential operational configurations thereof; and FIGS. 3a through 3c are views similar to FIGS. 2a through 2c showing a variation in accordance with the invention.

DESCRIPTION OF THE PREFERRED EMBODIMENTS

Turning now to FIG. 1, a piston bed apparatus in accordance with the invention, shown generally at 10, comprises a tubular housing 12 having a closed feed end 14 and an exit end 16 thereto.

A feed distributor 18, including a conduit 20, supplies a slurry of ice particles 22 and liquid 24 thereto. The housing 12 is provided with a plurality of drainage ports 26 through which the liquid 24 is discharged. As liquid 24 flows toward drainage ports 26, the particles 22 are consolidated into a bed 28 as they advance toward the exit end 16 of the apparatus 10.

As was stated above, it is necessary that the bed 28 have suitable stability upstream of the ports 26 to preclude erosion of the bed at that point. Such stability can be provided by suitable design of the unit according to principles well known in the art.

A rotary cutter 30, having blades 32 sweeping the diameter of the housing 12, is disposed at the exit end of the apparatus 10 and serves to comminute advancing portions of the bed 28 as they approach the exit end 16.

An inturned lip 34 is disposed at the exit end of the housing 12 to restrain egress of the bed 28 under the influence of hydraulic entry pressure in excess of hydraulic back pressure and frictional retarding force between the bed 28 and the housing 12. It is preferred that the effective cross sectional area of the lip be approximately about 5 percent, but especially in the range of about 2 to 15 percent of the cross sectional area of the column.

Referring now to FIGS. 2a through 2c, the operation of the cutter 30 in cooperation with the lip 34 is illustrated in detail. In FIG. 2a, the bed 28 is advanced to contact the lip 34 to be restrained thereby. In FIG. 2b, the cutter blade 32 has advanced, comminuting the bed 28 and separating the particles 22 for discharge and further processing. In FIG. 2c, the blade 32 has advanced leaving an undercut between the bed 28 and the lip 34 which is filled as the bed re-establishes the configuration of FIG. 2a under the influence of the hydraulic pressure at the entry end of the bed.

FIGS. 3a through 3c, illustrate a variation in accordance with the invention wherein components thereof corresponding to like components of the preceding Figures are indicated by like numerals only of the next higher order. A lip 134 is disposed at the exit end of the housing 112 at an inwardly tapering angle with the longitudinal centerline of the housing. As seen in FIG. 3a, the lip 134 restrains the bed 128 against egress from the housing as the cutter blade 132 advances. In FIG. 3b, the blade 132 comminutes the upper surface of the bed 128 separating particles 122 for discharge from the column 112. In FIG. 3c it can be seen that a recess remains in the upper surface of the bed after the cutter 132 passes. The zone of the bed beneath the lip 134 then pushes out into the center as particles 122 as the bed 128 advances to re-establish the configuration of FIG. 3a.

It should be noted that the housings 12 and 112 can be disposed vertically, horizontally or at any other angle found desirable. The housings can also have an increasing cross-sectional area between the inlet and discharge ends, for example, a truncated cone for a circular cross-section. The housings can also be of cross sectional configuration other than circular if so desired.

For example, the housing may be rectangular in which case the cutters would be designed to operate in a reciprocatory sweep mode rather than the rotary mode illustrated.

The cutter may also be mounted on the lip as a sliding member which is pulled around the lip by suitable mechanical means. In such a case, the demanding tolerances and blade strength which would otherwise be required in large diameter housings where the blade passes closely to the lip, would be eliminated.

As illustrated, the housing lip is engaged only by the portion of the bed in advance of the cutter, the cutter essentially describing a helix relative to the bed as the bed is advanced through the housing. As design and balance dictate, the cutter may be provided with two or more blades.

As indicated previously, this invention is especially adaptable to controlling the advance of the piston bed in the operation of the invention described in U.S. Pat. No. 3,251,193, May 17, 1966, and as especially applied to the treatment of saline water, the patent being incorporated by reference herein.

For even further details of the present invention, reference is directed to the doctoral thesis: Newton Landis, "Trapping of Particles in Compacting, Moving Beds of Solids", Cornell University, Sept. 1, 1968, this thesis being also incorporated by reference herein.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for controlling a consolidating bed of particulate solids comprising the steps of developing particulate solids from a slurry, propelling said bed of solids through a tubular housing, and concurrently flowing liquid through said housing, the improvement comprising the steps of restricting passage of said bed proximate the downstream end of said tubular housing to mechanically block egress of said bed therefrom, and said restricting being accomplished by an inturned lip extending from said housing; and comminuting advancing portions of said bed approaching said one end of said passage.

2. A process in accordance with claim 1 wherein a downstream surface in the inturned lip in said passage extends substantially normal to the centerline of said passage, and wherein said bed is comminuted to undercut the portion thereof approaching said surface.

3. A process in accordance with claim 1 wherein a downstream surface of the inturned lip in said passage tapers inwardly in the downstream direction with respect to the centerline of said passage and wherein said bed is comminuted to the inner periphery of said inturned lip.

4. A process as defined by claim 1 wherein said comminuting comprises cutting the advancing bed with a sweeping action.

5. A process as defined by claim 4 wherein said sweeping action is conducted with at least one blade extending radially from an axis parallel to the center line of said passage.

6. A process as defined by claim 1 wherein said restricting comprises the restricting action of an inturned lip of said tubular housing.

7. A process as defined by claim 6 wherein said blade sweeps the interior circumference of said passage and the interior surface of said lip.

8. A process as defined by claim 7 wherein said lip is substantially normal to the center line of said passage.

9. A process as defined by claim 6 wherein said lip is at an angle with the center line of said passage and wherein said sweeping action sweeps proximate the innermost edge of said lip.

10. A process as defined by claim 1 wherein said particulate solids are ice particles.

11. A process as defined by claim 1 wherein said restricting is accomplished by an inturned lip extending from and unitary with said housing.

* * * * *